(12) United States Patent
Gattuso et al.

(10) Patent No.: US 6,905,078 B1
(45) Date of Patent: Jun. 14, 2005

(54) HEADLAMP WASHER SYSTEM

(75) Inventors: David A. Gattuso, Deerfield, NH (US); Martyn Jenkins, South Wales (GB); Malcolm Claydon, Worcester (GB)

(73) Assignee: McCord Winn Textron, Manchester, NH (US)

( * ) Notice: Subject to any disclaimer, the term of this patent is extended or adjusted under 35 U.S.C. 154(b) by 0 days.

(21) Appl. No.: 09/958,119

(22) PCT Filed: Feb. 29, 2000

(86) PCT No.: PCT/US00/05125
§ 371 (c)(1),
(2), (4) Date: Apr. 15, 2003

(87) PCT Pub. No.: WO00/51745
PCT Pub. Date: Sep. 8, 2000

Related U.S. Application Data
(60) Provisional application No. 60/122,014, filed on Mar. 1, 1999.

(51) Int. Cl.$^7$ ............................. B05B 17/04; B05B 1/10
(52) U.S. Cl. ...................... 239/11; 239/284.2; 239/204; 239/205
(58) Field of Search ............................. 239/1, 11, 204, 239/205, 284.1, 284.2, 451, 456, 458, 459, 533.1, 533.15, 583, 589

(56) References Cited

U.S. PATENT DOCUMENTS

| | | | |
|---|---|---|---|
| 3,736,560 A | 5/1973 | Hart | 340/53 |
| 3,940,066 A | 2/1976 | Hunter | 239/204 |
| 4,713,583 A | 12/1987 | Hochstein | 315/82 |
| 5,242,114 A | 9/1993 | Camier et al. | 239/284.2 |
| 5,269,464 A * | 12/1993 | Epple et al. | 239/284.2 |
| 5,605,286 A | 2/1997 | Orth et al. | 239/284.2 |
| 5,762,271 A | 6/1998 | Lind et al. | 239/284.2 |
| 5,769,323 A | 6/1998 | Hartick et al. | 239/284.2 |
| 5,769,528 A | 6/1998 | Dinant | 362/96 |
| 6,234,410 B1 * | 5/2001 | Martin et al. | 239/284.2 |
| 6,398,130 B2 * | 6/2002 | Pfalzgraf | 239/284.2 |

FOREIGN PATENT DOCUMENTS

| | | | |
|---|---|---|---|
| EP | 0 760 318 B1 | 8/1996 | B60S/1/52 |
| GB | 2 026 851 A | 8/1979 | P60S/1/52 |
| GB | 2 267 215 A | 5/1992 | B60S/1/52 |
| GB | 2272 363 A | 11/1992 | B60S/1/52 |
| GB | 2 274 410 | 1/1993 | B05S/1/24 |
| GB | 2 280 489 | 7/1993 | F16K/15/14 |
| JP | 10119731 A | 10/1996 | B60S/1/60 |

* cited by examiner

Primary Examiner—Steven J. Ganey
(74) Attorney, Agent, or Firm—Grossman Tucker Perreault & Pfleger, PLLC (57) ABSTRACT

A spraying device comprising a housing 12 containing a top and bottom portion defining a chamber therein for fluid ingress and egress into the bottom portion wherein the housing includes an outer structure 18 containing an inner structure 16, and a tensioning device 22 which releasably positions the outer structure at the housing bottom. The inner structure 16 is engaged to an arm member 20 for spraying said fluid, such that the inner structure causes the arm member to move in a linear and rotating relationship relative to housing. The outer structure 18 and inner structure 16 are engaged to one another such that the outer structure 18 causes the inner structure to move in a linear and rotating relationship relative to the housing. The ingress of fluid in the chamber causes the inner and outer structures to move linearly and at a predetermined point the inner structure is prevented from moving in the liner direction while the outer structure continues to move linearly, thereby causing said inner structure to rotate.

13 Claims, 12 Drawing Sheets

HEADLAMP WASHER SYSTEM

This application is a 371 of PCT/US00/05125 filed Feb. 29, 2000, which is a continuation-in-part of Provisional application 60/122,014 filed Mar. 1, 1999.

The present invention relates to a mechanical washer system suitable for direct coverage of an automobile headlamp while minimizing fluid use. In addition, the headlamp washer system herein can be adapted to operate within the space parameters of a given automobile by permitting placement of the system in both a horizontal and vertical fashion.

A number of prior art references have disclosed spraying devices for a motor vehicle headlamp cleaning systems. For example, U.S. Pat. No. 4,713,583, entitled "Headlamp Cleaning System" relates to an assembly having a transparent lens with a light source thereinbehind within a housing to clean the lens when residue is sensed, and more particularly, relates to a cleaning system for headlamps on a vehicle.

U.S. Pat. No. 5,242,114, entitled "Glass Washing Apparatus for a Motor Vehicle" relates generally to an apparatus for washing motor vehicle headlamp glasses. Specifically, a glass washing apparatus is disclosed having a jet carrier in which the sealing means are more effective and better protected from the outside environment.

U.S. Pat. No. 5,269,464, entitled "Spraying Device for Motor Vehicle Headlamp-Cleaning Device" relates to a spraying device for headlamp-cleaning systems for motor vehicles. More particularly, the disclosure describes a device comprising a nozzle carrier, an actuating device for moving the nozzle carrier in a telescope manner out of a retracted rest position in a cylindrical receiving and guide tube, which is retracted in a vehicle body into an operating setting in an area in front of a diffusing screen of a vehicle headlamp.

U.S. Pat. No. 5,769,323, entitled "Headlamp Cleaning System for a Motor Vehicle" relates to a headlamp cleaning arrangement for a motor vehicle which has a telescopically extendable nozzle which extends through an opening in the outer wall of the motor vehicle in an area near the headlamp. The opening in the outer wall has a cover which is pivotably mounted near a lower rim of the opening in the outer wall and is held in a closed position by a spring arrangement. When the nozzle arrangement is extending into its operative position to clean the headlamp, the nozzle arrangement pushes the cover, causing it to pivot open.

Attention is also directed to U.S. Pat. No. 5,769,323, entitled "Headlamp With Optional Lens Washing Device And A Method For Making Such Headlamp", which describes a headlamp for a motor vehicle that includes a hollow body. A lens closes a front opening of said body and has along one edge thereof either a secondary portion integral with a primary portion of said lens, or a recess instead of said secondary portion. The lens is cut with said secondary portion integral with said lens when no lens washing device is provided on the headlamp. The lens is cut without said secondary lens portion, when the headlamp is to be equipped with a lens washing device, so as to define a recess through which said lens washing device can project when in use.

Japanese Patent Publication No. 10119731, entitled "Headlight Cleaning Device for a Vehicle" (Abstract) describes a problem to be solved as setting a length of an outer cylinder body in a cleaning liquid jetting condition longer than that in a housed condition by expanding the outer cylinder body by means of expansion of a spring member expanded by fluid pressure of the cleaning liquid supplied to the outer cylinder body inside and jetting the cleaning liquid from a jet nozzle.

Finally, attention is directed to UK Patent Application No. 2,280,489A, entitled "A Non-Return Valve", which recites a non-return valve, e.g., for a windscreen washed device. Also, attention is directed to UK Patent Application No. 2,274,410, entitled "Jet Assembly for Vehicle Screen Washer", which discloses a jet assembly for a vehicle screenwash system comprising a jet body incorporating an axial bore and a nozzle at one end. The jet body incorporates an electrical heating element adapted to heat the body and the nozzle and this is retained in position by means comprising part of the jet body. Finally, attention is directed to UK Patent Application No. 2,272,363A, entitled "Telescopic Washer", which relates to a telescopic washer for motor vehicle screens.

In summary form, the present invention comprises a spraying device, particularly suited for a motor vehicle lamp washing system, comprising a housing containing a top and bottom portion defining a chamber therein for fluid ingress and egress into said bottom portion wherein said housing also includes an outer structure itself containing an inner structure along with a tensioning device which releasably positions said outer structure at said housing bottom. The inner structure is engaged to an arm member for spraying said fluid, such that said inner structure, via mechanical interaction, causes said arm member to move in a linear and rotating relationship relative to the housing. The outer structure and inner structure are mechanically engaged to one another such that said outer structure causes said inner structure to move in a linear and rotating relationship relative to said housing. The ingress of fluid in said chamber causes said inner and outer structure to move linearly and at a predetermined point the inner structure is prevented from moving in said liner direction while said outer structure continues to move linearly, thereby causing said inner structure to rotate.

In method summary form, the present invention comprises a method of selectively positioning an arm containing a nozzle to provide a spraying pattern on a given surface, wherein said positioning is achieved via fluid-driven mechanical operation. The mechanical-driven operation comprises introducing fluid into a housing containing a chamber for ingress and egress of fluid, wherein said chamber further contains a linearly displaceable inner structure engaged with an outer linearly displaceable structure. The inner structure is also capable of rotational displacement. Fluid ingress thereby displaces said inner and outer structures in a first linear direction followed by rotational displacement of said inner structure due to linear displacement of said outer structure.

Figure 1A:
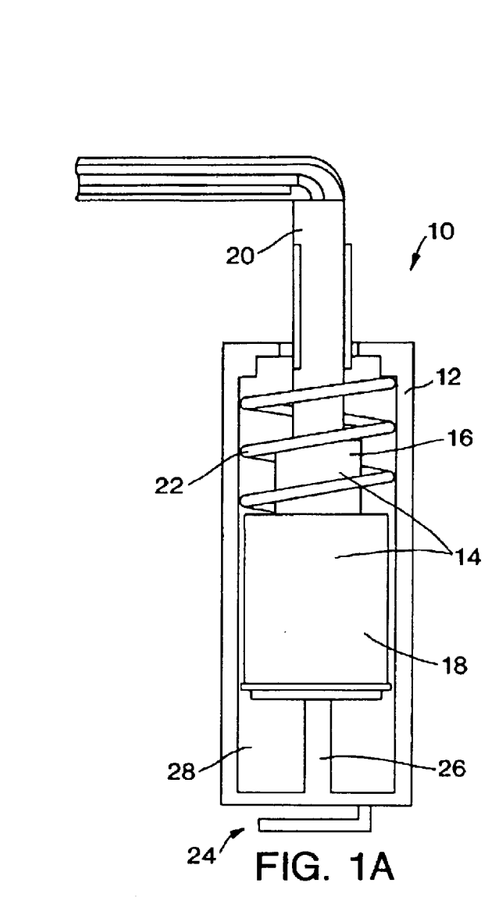
FIGS. 1A, 1B and 1C are partial cutaway view of the headlamp washer system of the present invention.
Figure 1B:
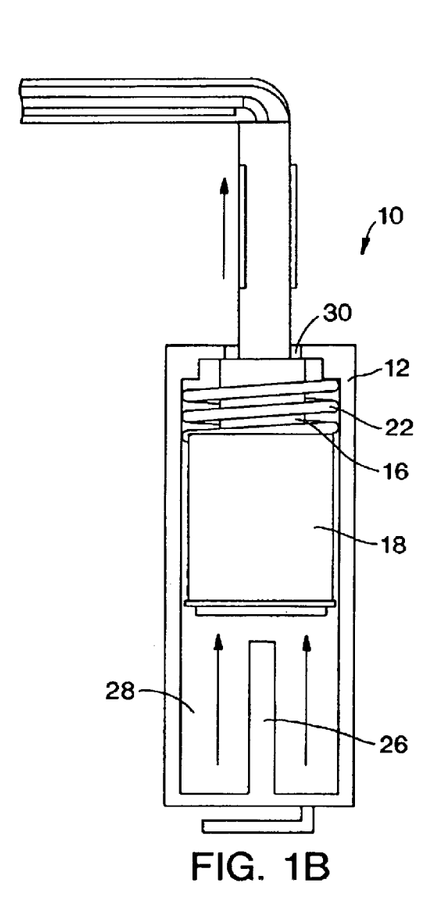
Figure 1C:
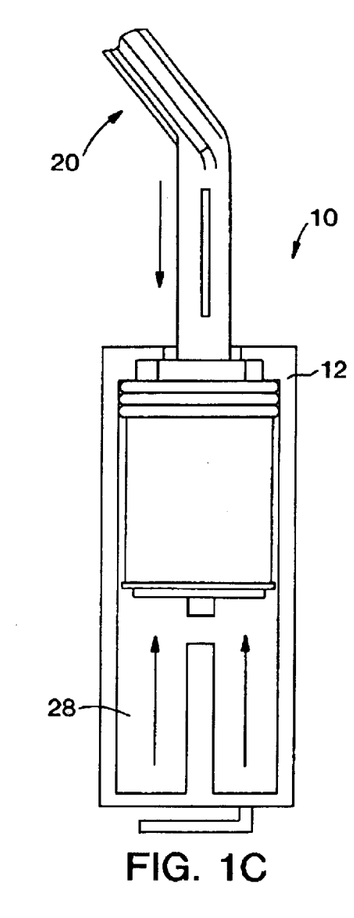

As noted above, FIGS. 1A, 1B and 1C are partial cutaway views of a preferred embodiment of the present invention. As an overview, FIGS. 1A–1C represent the system in the parked position, popped position, and rotating position, respectively. The system 10 includes a housing 12, a helix structure 14 (which collectively includes an outer helix 18 and a mated inner helix 16, a spring member 22, a washer arm 20 attached to the helix structure 14, and a fluid input 24. Housing 12 generally defines a chamber therein which fluid is permitted ingress and egress, and includes guide members 26. The fluid supply can be derived from a pump (not shown) or other means, and may include automatic and/or manual control of the duration of forced fluid flow.

Figure 11:
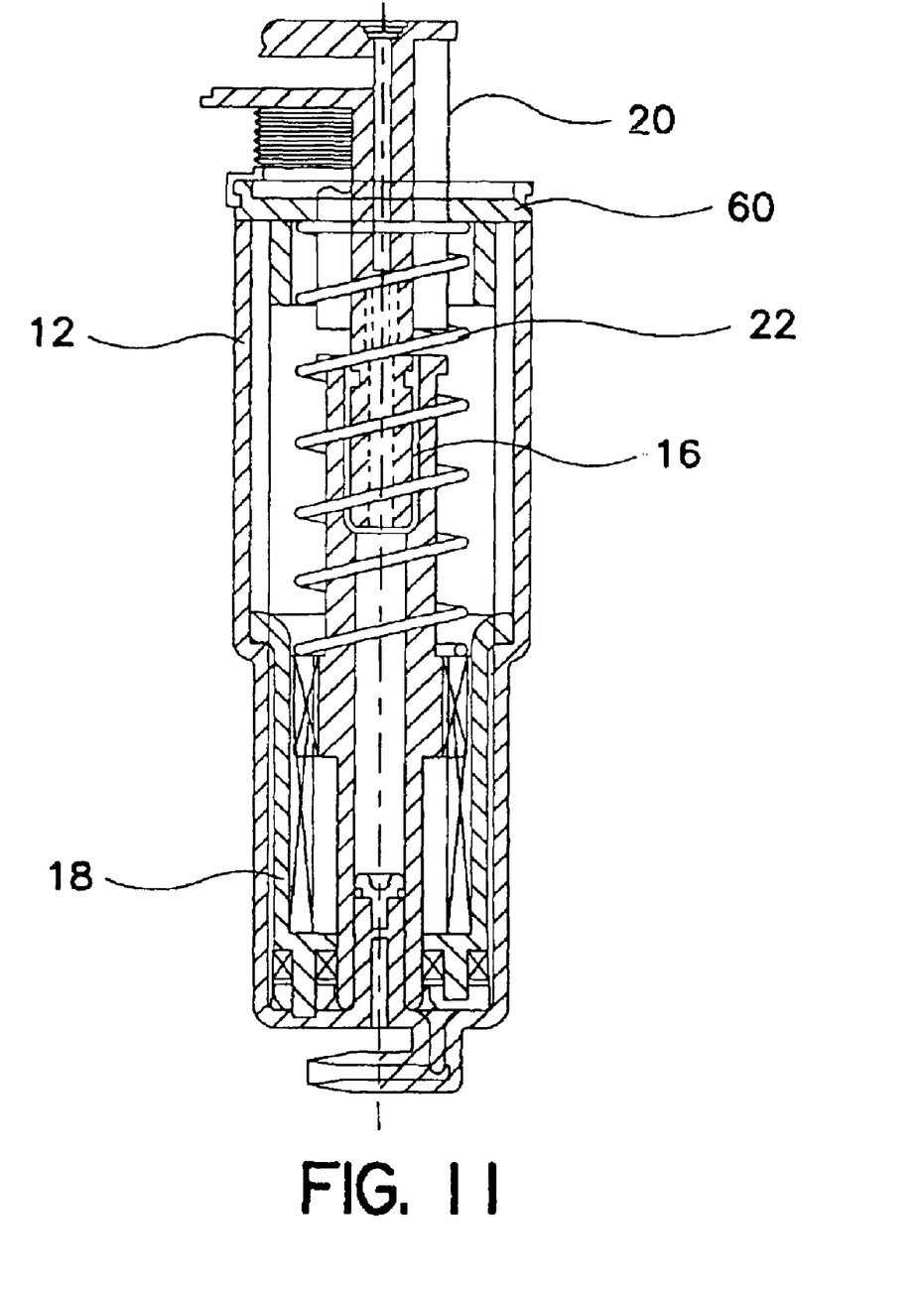
FIGS. 11, 12 and 13 are related cross-sectional views of the headlamp washer system of FIGS. 1A, 1B and 1C.
Figure 12:
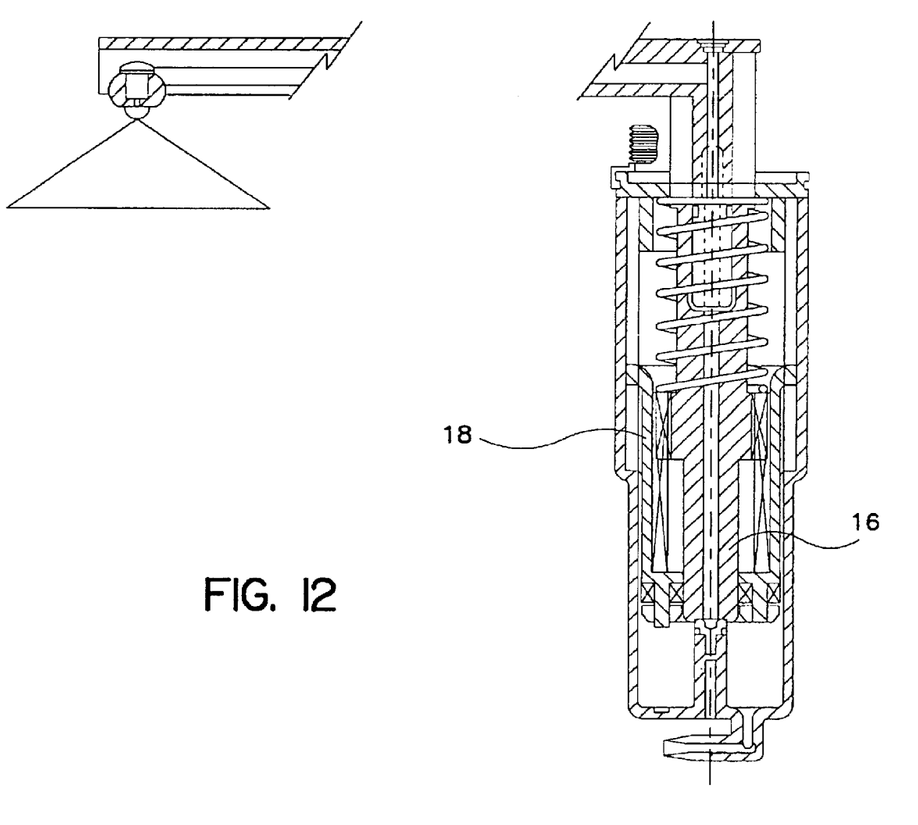

FIG. 1A and FIG. 11 shows the parked (i.e., non-moving) position of the system 10 of the present invention. In FIG. 1A and FIG. 11, spring 22 forces the helix structure 14, and more particularly the outer helix member 18 into a down (or parked) position. Chamber 28 is empty of fluid in the position shown in FIG. 1A. As fluid enters chamber 28, as shown in FIG. 1B and FIG. 12, the helix structure 14 is forced upwards from the bottom, as shown by the indicated arrows. Additionally, arm member 20 is forced in the same direction, thereby "popping" the arm out of, or away from, the facia (described below). To that end, spring 22 is chosen to have an appropriate force constant which can be overcome by fluid force in chamber 28. Also, as shown in FIG. 11, housing 12 may contain a separate top portion 60.

The distance at which the arm member travels in the linear direction is defined by the distance between the top of the inner helix member 16 and the top of the housing. Once the inner helix 16 meets the top of the housing (shown at point 30 in FIG. 1B), the inner helix member can no longer move in linear direction, and the helix structure is cleared from the guide member 26. Also, at this point, spring 22 is partially compressed. Fluid begins to flow within a chamber (not shown) defined by the inner helix 16 which flows out arm member 20 through a nozzle (not shown).

Figure 13:
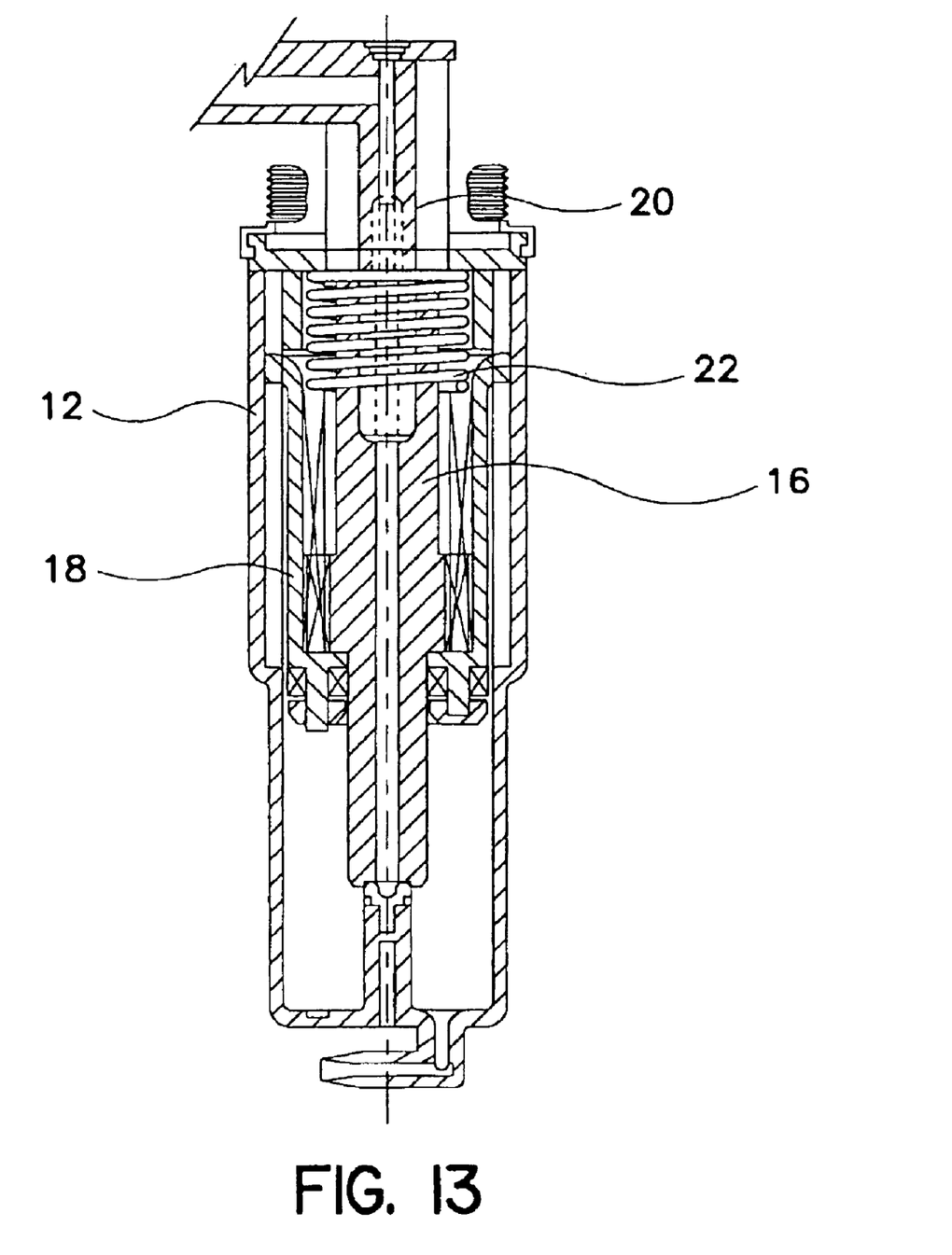

As noted above, once the inner helix meets the housing (at point 30) the inner helix can no longer move in a linear direction. However, turning to FIG. 1C and FIG. 13, the outer helix 18 does continue to move linearly, and as described below, causes the inner helix to rotate, thus causing the spraying arm 20 to rotate.

Figure 2:
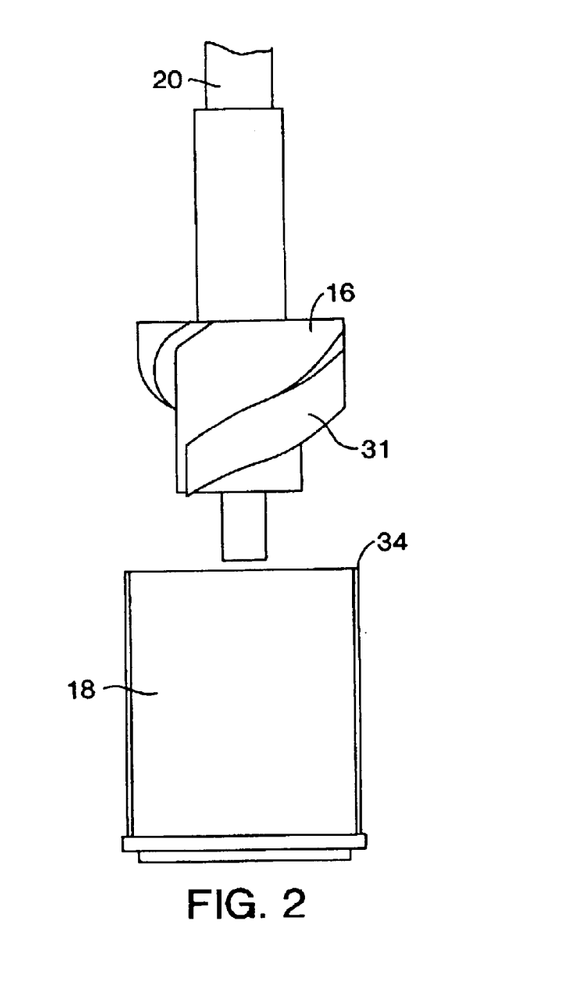
FIGS. 2 and 3 are exploded isometric views of the rotating helix structure of the headlamp washer system of the present invention.
Figure 3:
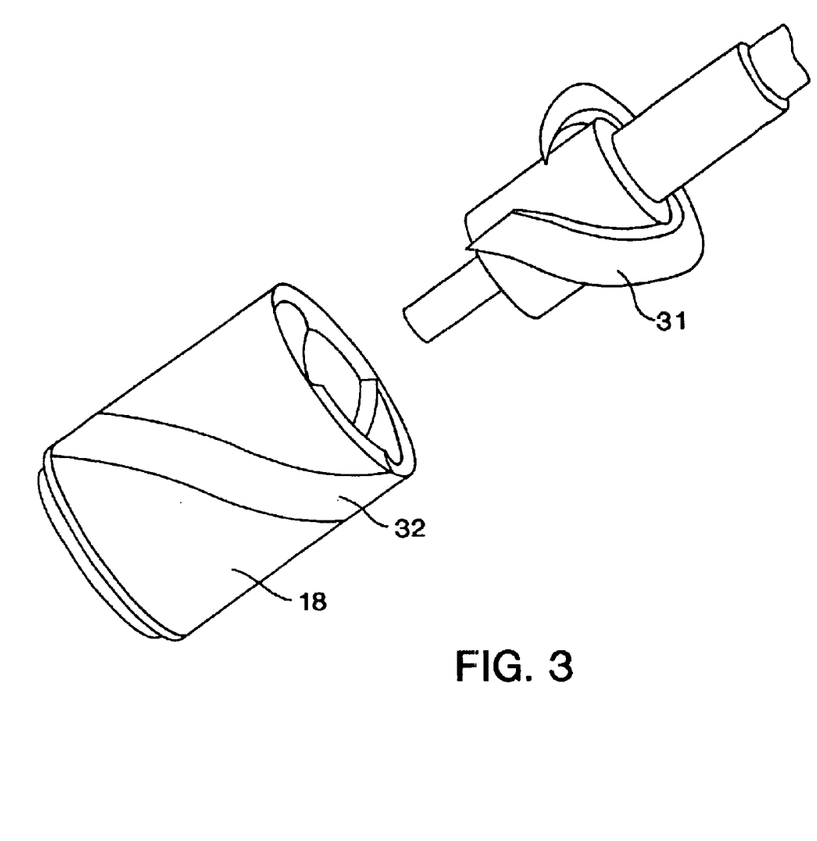

FIGS. 2 and 3 provide exploded isometric views of the inner 16 and outer 18 helix members. As noted above, the inner and outer helix members are mated male-female screw-type engagement members. To that end, inner helix 16 includes male helical members 31 which mate with female helical members 32 (shown in shadow in FIG. 3). Male-female helix members 30 and 31 provide the rotational movement of the inner helix member 16, as described above.

Figure 4A:
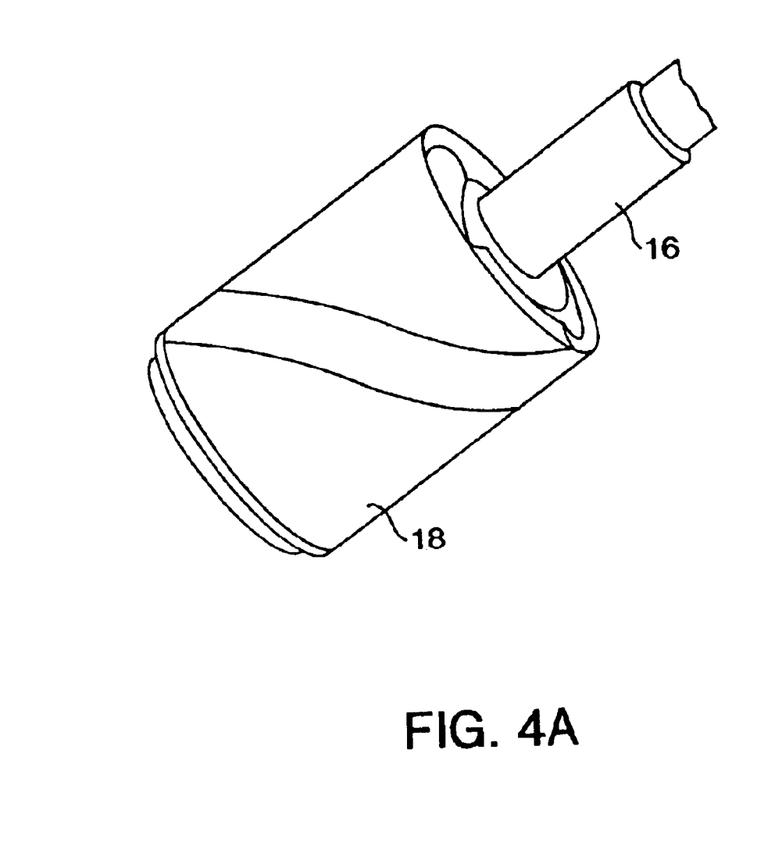
FIGS. 4A and 4B are assembled isometric views of the rotating helix structure of the headlamp washer system of the present invention.
Figure 4B:
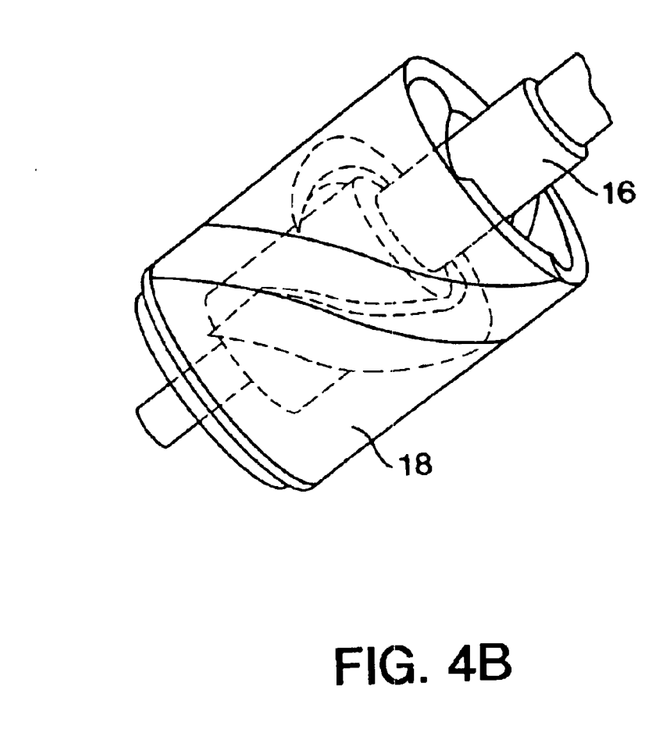

To prevent rotation of the outer helix 18, the outer helix includes keys 34 located on the periphery. The keys 34 match a key arrangement on the inner surface of the housing 12 (not shown). FIGS. 4A and 4B depict views of the outer and inner helix in a static position (FIG. 4A) and a fully rotated position (FIG. 4B). FIGS. 5–8 depict detailed sectional views of the system 10 shown in FIGS. 1–4B. It should be noted that in FIG. 8 the arm member 20 includes nozzles 52 which may be connected to the fluid flow within the arm member via tubing (not shown) or arm member can be hollow to define passage 54.

Once the inner helix has rotated completely and fluid force has ceased, the spring 22 forces the outer helix back down into the housing which in turn causes the inner helix to rotate in the reverse direction until both the inner and outer helix are at rest, as shown in FIG. 4A.

Figure 9:
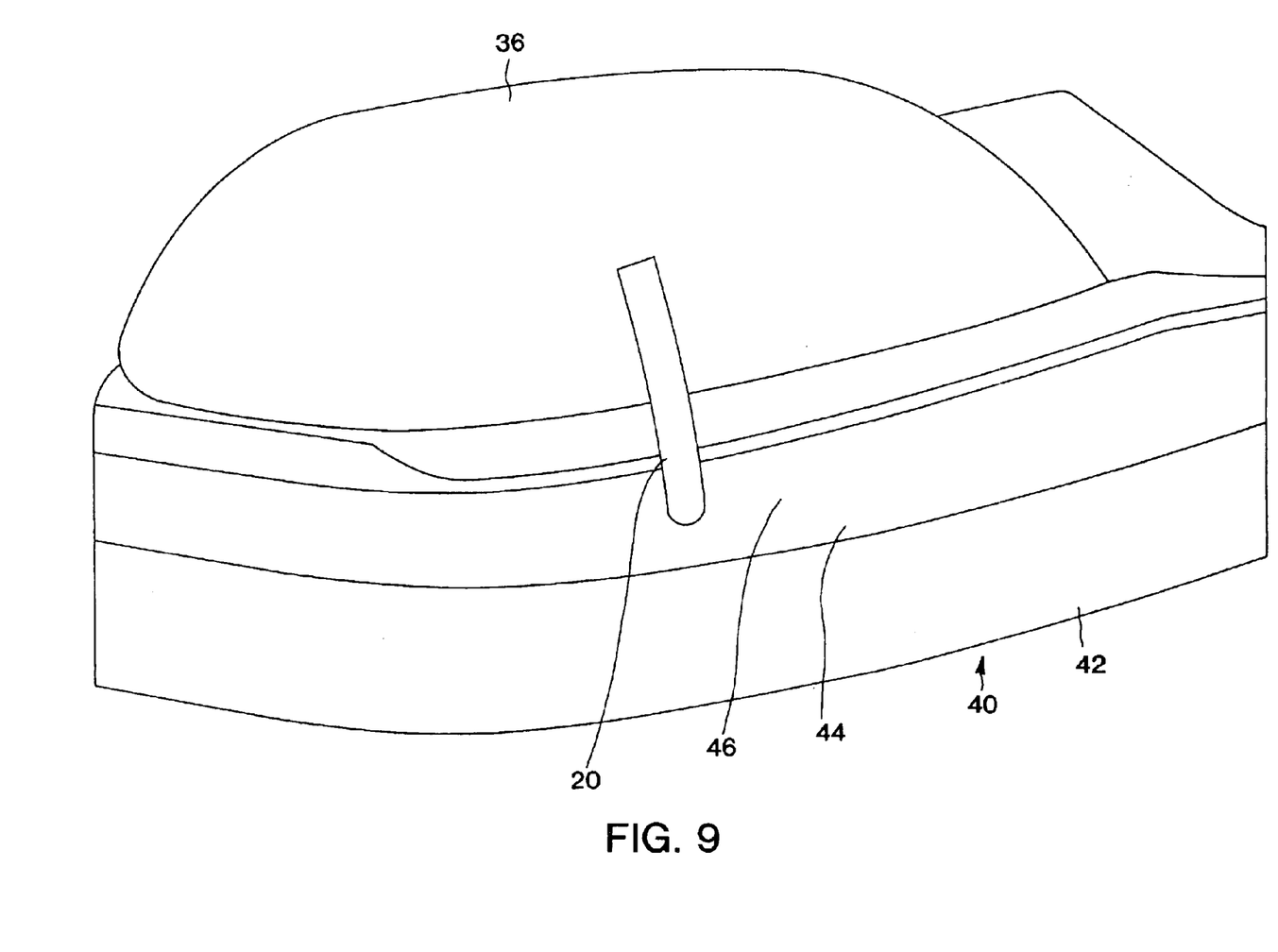
FIG. 9 is an isometric view of one embodiment of the positioning of the sprayer arm mechanism of the present invention.
Figure 10:
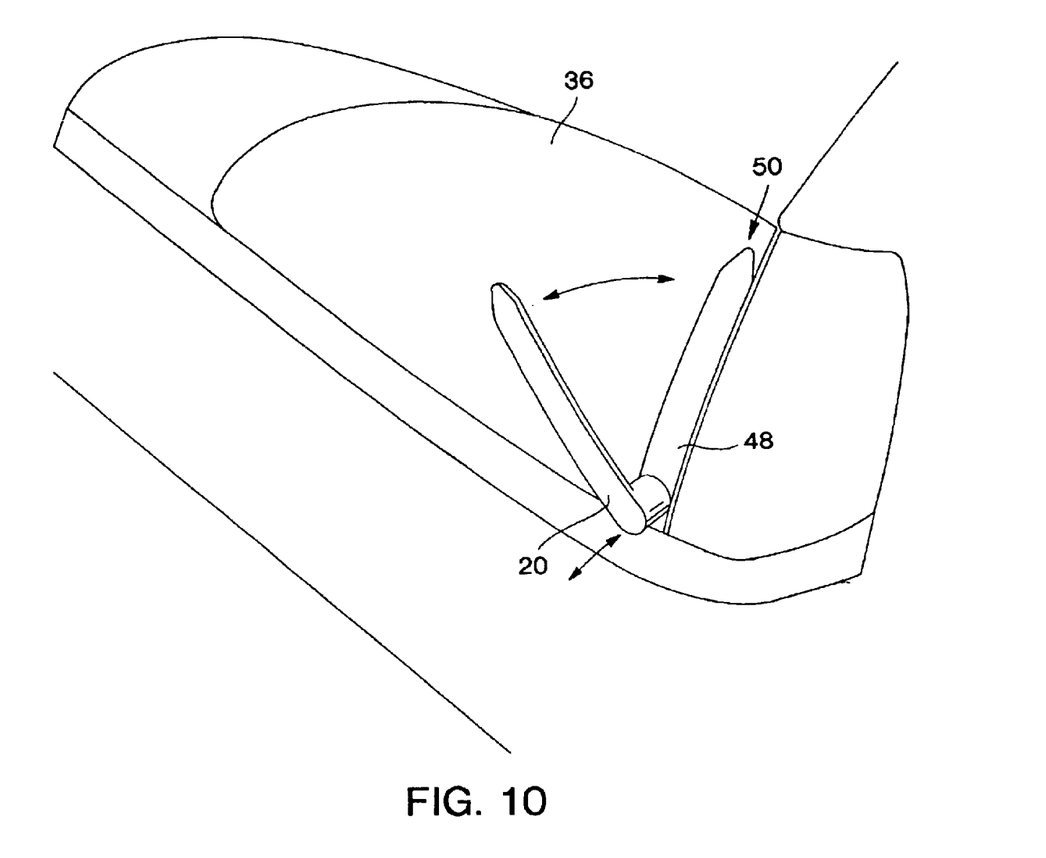
FIG. 10 is an isometric view of another embodiment of the positioning of the sprayer arm mechanism of the present invention.

FIGS. 9 and 10 depict embodiments of the placement of the headlamp washer system 10 of the present invention. In FIG. 9, the system 10 is placed on the upper surface 44 of a bumper 40 of an automobile. A slot or opening 46 houses the arm member 20 when not in use. Preferably, the placement is arranged to provide a maximum headlamp 36 coverage while minimizing the length of arm member 20. Of course, the system can be located on the front 42 of the bumper if space and/or coverage considerations require. In the embodiment shown in FIG. 10, the system 10 is located vertically along or near the headlamp housing 50, and operates in the same manner discussed above.

Figure 5:
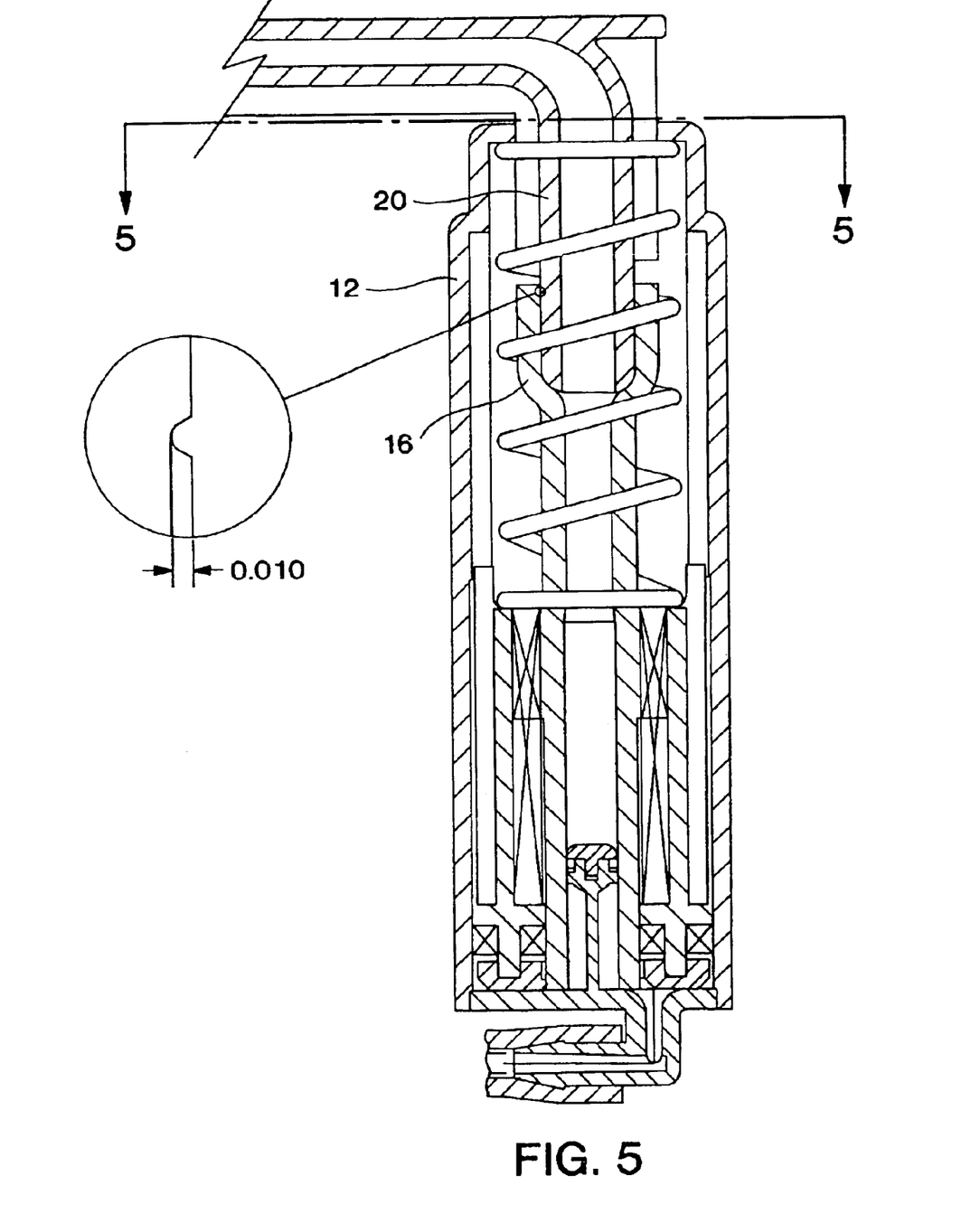
FIG. 5 is a detailed cutaway view of the headlamp washer system of FIGS. 1A–1C in the parked position.
Figure 6:
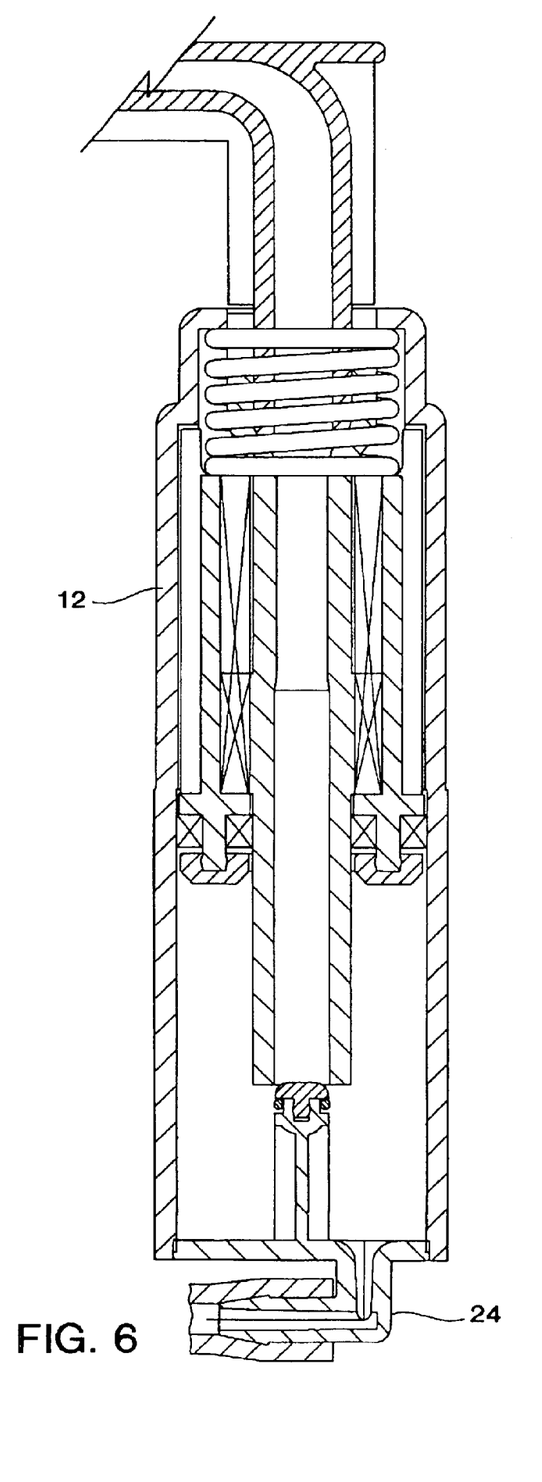
FIG. 6 is a detailed cutaway view of the headlamp washer system of FIGS. 1A–1C in the spraying position.
Figure 7:
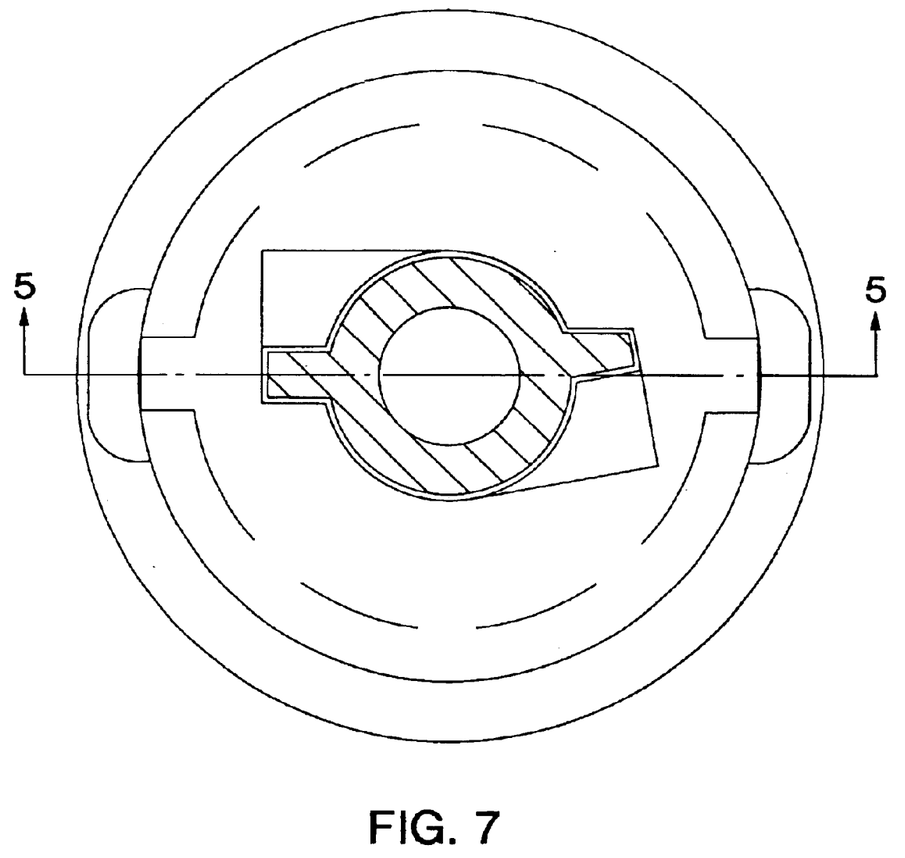
FIG. 7 is a cross-sectional view taking along reference line 5—5 of the headlamp washer system of FIG. 5.
Figure 8:
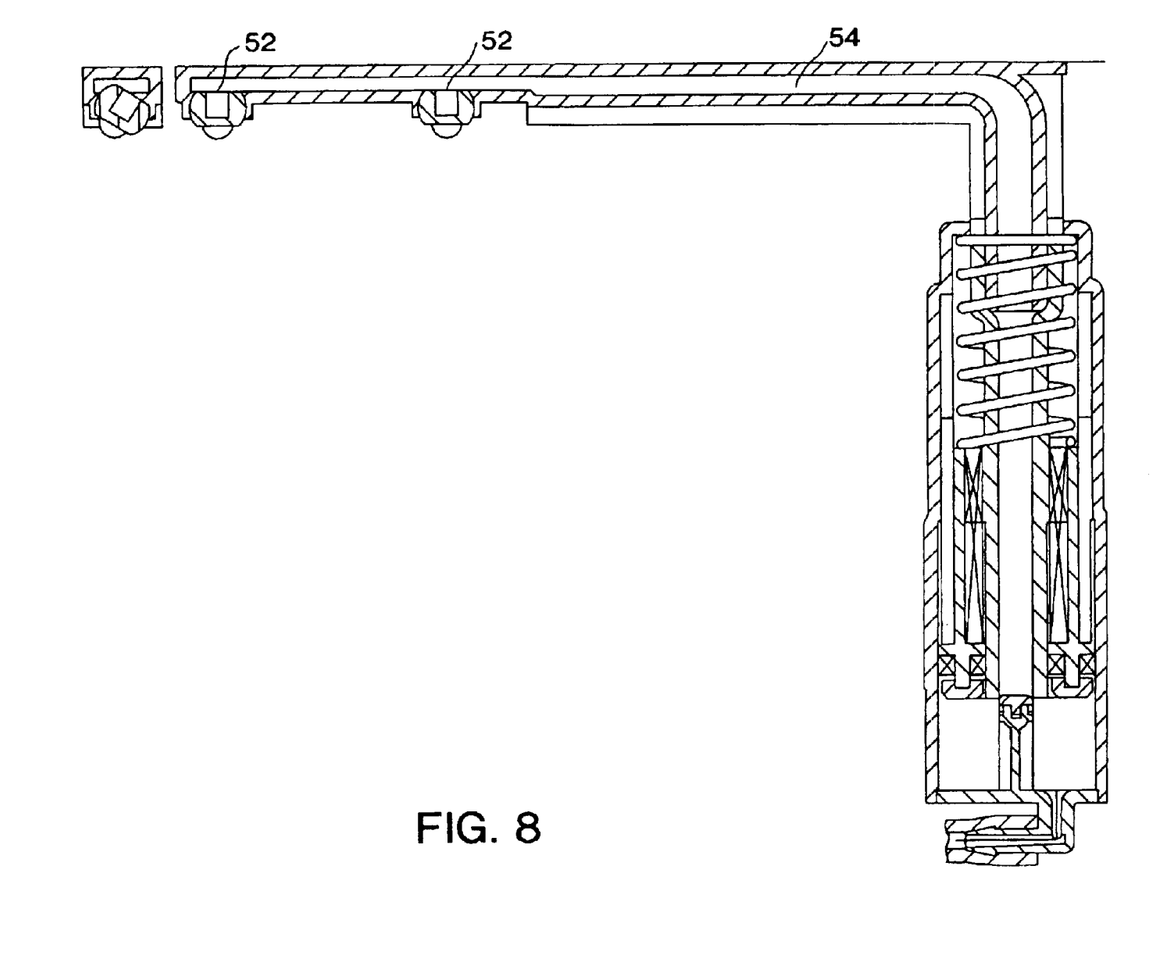
FIG. 8 is a detailed cutaway view of the headlamp washer system of FIG. 5 and including the sprayer arm mechanism.

As shown in FIG. 5, a sealing barb may be employed to seal the arm 20 to the inner helix 16. Alternatively, this can readily be achieved by an O-ring type seal to facilitate assembly of the arm into the system 10 of the present invention. In addition, the housing 12 is conveniently manufactured from a plastic material, such as a thermoplastic material, including engineering thermoplastics. A particularly preferred material is a thermoplastic polyester, specifically poly(butylene terephthalate). In addition, it has been found preferable to manufacture the arm 20 from those plastic materials that are designed to have enhanced UV stability, given their exposure to sunlight.

In terms of the method of operation of the present invention, and with reference to the attached drawings, it can be appreciated that fluid entry into nozzle 24 provides a maximum lift of linear movement to outer helix 18. Accordingly, once outer helix 18 clears guide member 26, fluid can then flow within arm member 20 and provide the appropriate spray/wash at the nozzle end 52. That being the case, in method form, the present invention broadly provides a method of selectively positioning a spraying nozzle to provide a spraying pattern on a given surface, via non-electrical means, i.e., via fluid driven type mechanical operation. That is, the fluid employed herein is relied upon to both position the spraying device herein, and to spray/wash a given surface.

The method comprises first supplying a housing structure which contains a chamber therein for fluid ingress and egress into the botttom portion thereof, the housing also including outer and inner mechanical structures and a tensioning device to position the outer and inner structure at said housing bottom, the inner structure engaged to an arm member containing a nozzle for spraying said fluid. Upon ingress of fluid into said bottom portion of said housing, said inner and outer structures are caused to first move in linear direction, thereby causing said arm member to similarly move in linear direction. Upon further ingress of fluid, said inner structure is prevented from further linear movement, and caused to rotate, which thereby causes said arm member to rotate to a desired spraying position. Upon removal of said fluid flow, the operation noted herein operates in reverse, the arm member rotating in opposite direction, followed by a linear retraction.

It will be appreciated by those skilled in the art that although the above description has been described with respect to certain various embodiments, the invention herein is not intended to be so limited. It is therefore to be understood that within the scope of the appended claims wherein reference numerals are merely for convenience and are not to be in any way limiting, the invention may be practiced otherwise than as specifically described.

What is claimed is:

1. A spraying device comprising a housing containing a top and bottom portion defining a chamber therein for fluid ingress and egress into said bottom portion wherein said housing includes an outer structure containing an inner structure, and a tensioning device which releasably positions said outer structure at said housing bottom;

said inner structure engaged to an arm member for spraying said fluid, such that said inner structure causes said arm member to move in a linear and rotating relationship relative to housing;

said outer structure and inner structure engaged to one another such that said outer structure causes said inner structure to move in a linear and rotating relationship relative to said housing;

wherein the ingress of fluid in said chamber causes said inner and outer structure to move linearly and wherein at a predetermined point the inner structure is prevented from moving in said linear direction while said outer structure continues to move linearly, thereby causing said inner structure to rotate.

2. The spraying device of claim 1 wherein said outer structure and said inner structure respectively comprise a male helical member and female helical member.

3. The spraying device of claim 1, wherein said inner structure is prevented from moving in said linear direction by contacting said top portion of said housing.

4. The spraying device of claim 1 wherein said arm member includes a nozzle connected to said arm member.

5. The spraying device if claim 1 wherein said tensioning device comprises a spring.

6. The spraying device of claim 1 wherein said outer structure is mechanically engaged to said housing to restrict said outer structure rotation.

7. A spraying device for a headlamp or taillight-cleaning system for a motor vehicle comprising a housing containing a top and bottom portion defining a chamber therein for fluid ingress and egress into said bottom portion wherein said housing includes an outer structure containing an inner structure, and a tensioning device which releasably positions said outer structure at said housing bottom;

said inner structure engaged to an arm member for spraying said fluid, such that said inner structure causes said arm member to move in a linear and rotating relationship relative to housing;

said outer structure and inner structure engaged to one another such that said outer structure causes said inner structure to move in a linear and rotating relationship relative to said housing;

wherein the ingress of fluid in said chamber causes said inner and outer structure to move linearly and wherein at a predetermined point the inner structure is prevented from moving in said liner direction while said outer structure continues to move linearly, thereby causing said inner structure to rotate.

8. The spraying device system of claim 7, said device positioned within a bumper of said motor vehicle.

9. The spraying device of claim 8, wherein said arm member is flush mounted in said vehicle bumper.

10. The spraying device of claim 7, said device positioned proximate a headlamp or tail-lamp housing.

11. A method of selectively positioning an arm containing a nozzle to provide a spraying pattern on a given surface, said positioning achieved via a fluid-driven mechanical operation, wherein said mechanical-driven mechanical operation comprises:

introducing fluid into a housing containing a chamber for ingress and egress of fluid, wherein said chamber further contains a linearly displaceable inner structure engaged with an outer linearly displaceable structure, said inner structure also capable of rotational displacement;

said fluid ingress displacing said inner and outer structure in a linear direction followed by rotational displacement of said inner structure due to linear displacement of said outer structure.

12. The method of claim 11, wherein said inner structure is engaged to said arm, which arm undergoes both linear and rotational displacement.

13. The method of claim 11, whereupon removal of said fluid in said housing, said inner structure moves in a rotational direction and linear direction counter to the rotational and linear direction caused by fluid ingress.

* * * * *